United States Patent [19]
Brunson et al.

[11] 3,732,422
[45] May 8, 1973

[54] COUNTER FOR RADIATION MONITORING

[75] Inventors: Glenn S. Brunson; Robert N. Curran; Franklin H. Just, all of Idaho Falls, Idaho

[73] Assignee: The United States of America as represented by the United States Atomic Energy Commission, Washington, D.C.

[22] Filed: May 23, 1972

[21] Appl. No.: 256,062

[52] U.S. Cl. ...................250/83.3 R, 250/71.5 R
[51] Int. Cl. .................................................G01t 1/16
[58] Field of Search ...................250/83.3 R, 71.5 R

[56] References Cited

UNITED STATES PATENTS 3,666,953  5/1972  Splichal ..........................250/83.3 R
3,585,388  6/1971  Laney ............................250/83.3 R Primary Examiner—James W. Lawrence
Assistant Examiner—Harold A. Dixon
Attorney—Roland A. Anderson

[57] ABSTRACT

A radiation counter repeatedly takes periodic samples by counting radiation pulses which are received during a predetermined period. The predetermined period is measured by a timing circuit. An amplitude measuring circuit measures the amplitude of the incoming radiation pulses and acts to disable the timing circuit whenever a radiation pulse above a particular amplitude is received. By disabling the timing circuit, dead time, during which the counting circuit will not detect radiation pulses, is not counted as part of the predetermined counting period.

7 Claims, 3 Drawing Figures

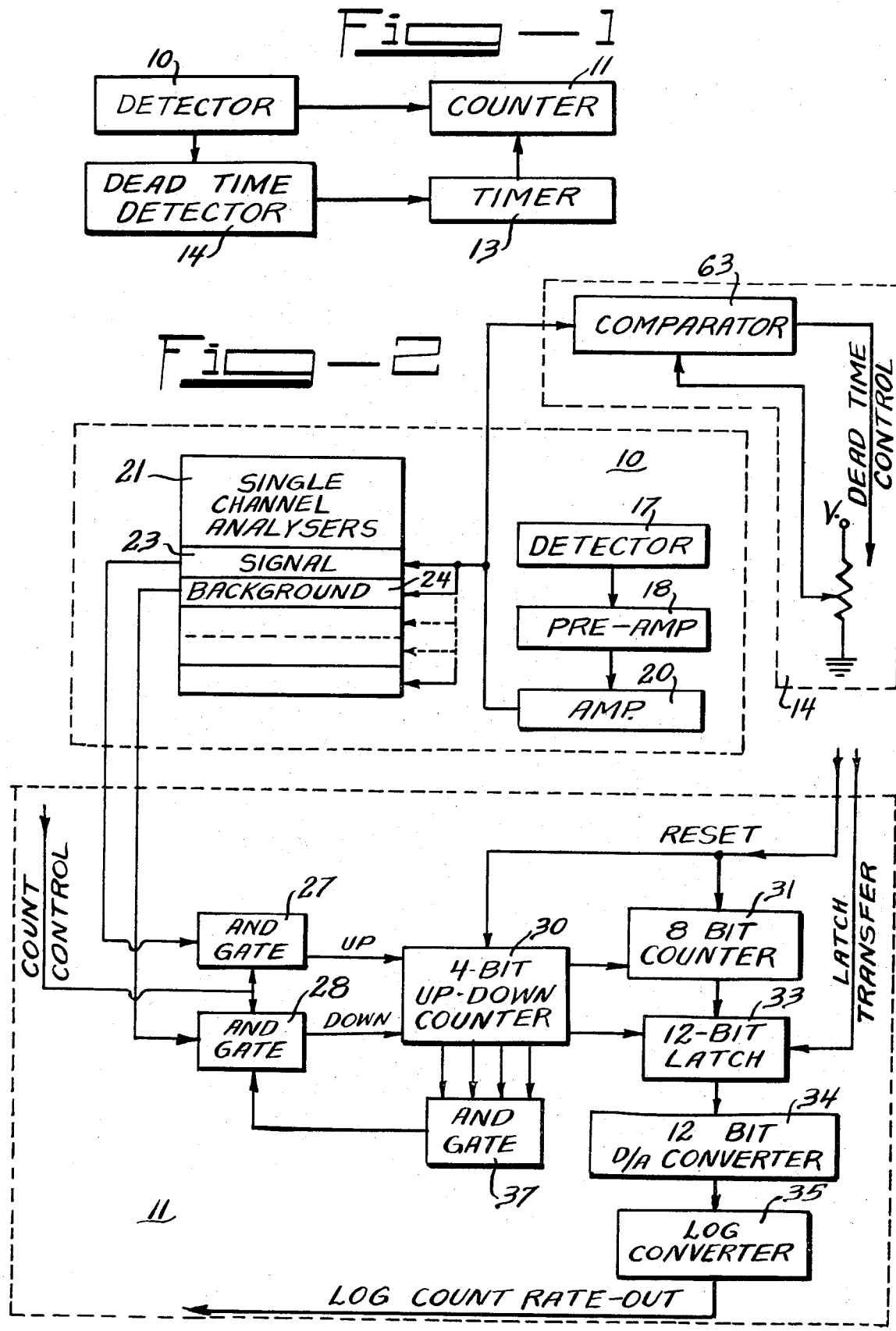

COUNTER FOR RADIATION MONITORING

CONTRACTUAL ORIGIN OR THE INVENTION

The invention described herein was made in the course of, or under, a contract with the UNITED STATES ATOMIC ENERGY COMMISSION.

BACKGROUND OF THE INVENTION

In one method of measuring radiation, radiation pulses are detected and separated according to energy in conventional single-channel analyzers. In order to separate the radiation emitted by a particular isotope at a particular energy level, the background radiation is subtracted from the radiation detected at the particular energy level of interest. Radiation pulses detected by one single-channel analyzer represent the background radiation at that energy level plus the radiation from a source which is to be measured. A nearby channel is selected which contains only the background radiation levels. The background count is subtracted from the desired signal plus background count in an up-down counter arrangement in which the desired signal plus background signal counts up and the background signal alone counts down. In order to obtain an accurate count, it is desirable to sample the radiation over a time period having a predetermined duration. Such samples can then be compared with samples taken at other time periods of the same predetermined duration to determine the changes in the radiation being monitored.

In order to compare accurately the radiation received at various times, it is necessary that the sampling period have the same time duration. Each time a radiation pulse is detected the detector is blocked for a short period of time and another radiation event occuring during this time would not be detected and recorded. Thus, each sampling period has a dead time which means that the effective sampling time period is less than the desired sampling time period. When the count rates are high, the dead time can be a very appreciable part of the sampling time period. Also, where the radiation sources of interest have decayed substantially during the interval between sampling periods, the amount of dead time in each period would be appreciably different, so that the sampling periods would not be the same and a direct comparison would not be accurate.

It is thus an object of this invention to provide an improved radiation counting device.

Another object of this invention is to provide a radiation counting device in which the dead time of the device is not counted as part of the sampling period.

BRIEF DESCRIPTION OF THE INVENTION

In practicing this invention, a series of pulses are received from a single-channel analyzer representing the radiation count of the background and the desired signal. A second series of pulses is also received from a single-channel analyzer representing the background radiation. The first series of pulses is counted "up" in an up-down counter and the second series of pulses is counted "down" in the up-down counter. By this means, the second series of pulses is subtracted from the first series of pulses so that the count in the up-down counter represents the radiation signal which is being measured. The count is taken over a predetermined sampling period as required by the radiation monitoring being carried out. When the radiation is received by the detection circuit, the system is blocked during the time of the receipt of the radiation, so that any additional radiation received during this time is not counted. Thus, there is a certain amount of dead time, depending upon the count rate, which is subtracted from the sampling period. In order to compensate for this dead time, a detection circuit is used which detects pulses having an amplitude greater than a predetermined amount and acts to increase the sampling period by an amount equal to this dead time.

BRIEF DESCRIPTION OF THE DRAWINGS

The invention is illustrated in the drawings, of which:

FIG. 1 shows a block diagram of the monitoring device;

FIG. 2 is a detailed block diagram of the detection, counting and dead time circuits of this device.

DETAILED DESCRIPTION OF THE INVENTION

Figure 3:
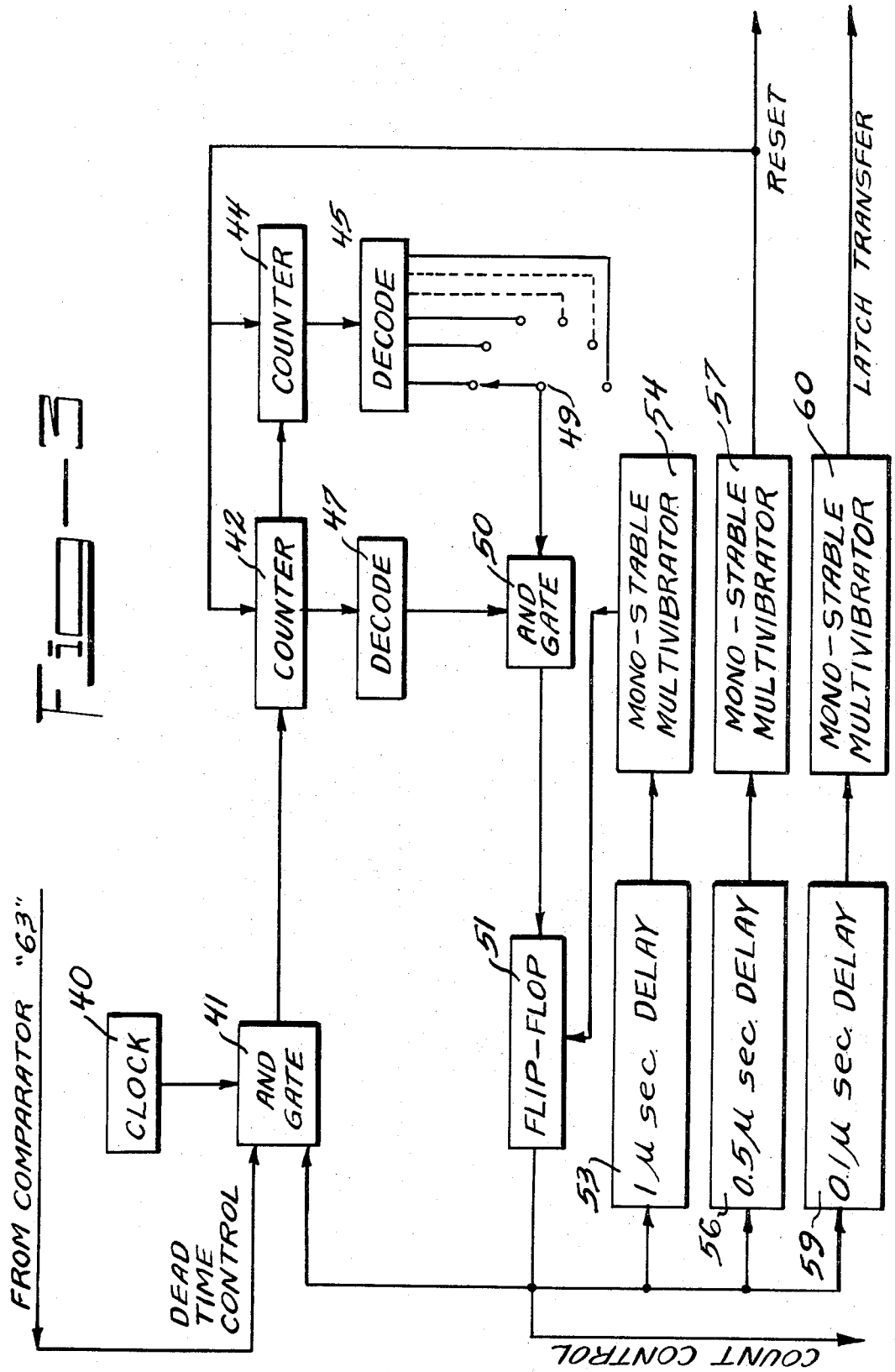
FIG. 3 is a detailed block diagram of the timing circuit of this device.

Referring to FIG. 1, there is shown a monitoring circuit of this invention. The detection circuit 10 receives radiation and develops input signals according to the energy content of the radiation. Signals representing the background radiation and the radiation which is being monitored is fed to counter 11 together with a signal representing the background radiation pulses. Counter 11 subtracts the background radiation signal from the signal which is a combination of the background and the desired radiation to determine the count of the radiation which is being measured. The timing circuit 13 turns on counter 11 for a predetermined sampling period and the radiation is counted during the sampling period. At the end of the sampling period, the count in counter 11 is read out and counter 11 is reset to zero to count during another sampling period.

The monitor thus described suffers from the disadvantage that each radiation signal received by detector 10 disables the system for a short period of time during which time any other radiation received is not counted. Thus the actual sampling time measured by timer 13 is decreased by the dead time caused by the radiation received by detector 10. Where the count rate is high or differs appreciably during different sampling periods, there is an error which is introduced by this dead time. In order to remove the dead time from the sampling period, a dead time detector 14 receives the radiation signals detected by detector 10 and develops a disabling signal whenever the amplitudes of the signals from detector 10 are above a predetermined level. The disabling signal acts to disable timer 13 for the time that the signal detected by detector 10 is present, so that the dead time caused by the presence of the signal in detector 10 is added to the sampling time and the sampling time at each sampling interval represents the actual time that the monitoring device is capable of receiving and counting the radiation.

Referring to FIG. 2, there is shown a detailed block diagram of the detection and counting circuits of FIG. 1. Detector 17 is a conventional radiation detector, for example a germanium-lithium-argon detector. The output of detector 17 is amplified in preamp 18 and amplifier 20 to develop an output pulse having an amplitude which is a function of the energy level of the radiation event detected in detector 17. These pulses are coupled to a plurality of single-channel analyzers 21. The single-channel analyzers 21 are conventional single-channel analyzers and act to separate the pulses according to their energy level. For example, the pulses representing the energy level of the desired signal are selected by the single-channel analyzer 23. In addition to the desired signal pulses at this energy level, single-channel analyzer 23 separates out background radiation which is at this signal level. Thus the output from single-channel analyzer 23 represents a combination of a desired signal and a background signal. An energy level near the desired signal level, but unaffected by the desired signal, is selected to measure the background signal level. These background pulses are selected by the single-channel analyzer 24 and represent the background radiation count.

The outputs of the single-channel analyzers 23 and 24 are coupled through AND gates 27 and 28 to a four-bit up-down counter 30. With AND gates 27 and 28 enabled, the signal plus background pulses count up in the up-down counter 30, while the background pulses count down. Thus, the background pulses are subtracted from the desired signal plus background pulses and the count which accumulates in the up-down counter represents the desired signal counts. When the count in the up-down counter 30 reaches 15, the counter is full. The 16th up pulse will then cause the count to spill over into the eight-bit counter 31 which accumulates the additional counts. Thus, the total number of pulses received are counted in the four-bit up-down counter 30 and the eight-bit counter 31. While in this example, a four-bit up-down counter and an eight-bit counter have been used to count the number of pulses received during a sampling interval, the invention is not restricted to counters having this capacity.

The output of the four-bit up-down counter 30 and the eight-bit counter 31, representing the total number of counts accumulated during a sampling period, are recorded in the 12-bit latch or memory 33 at the appropriate time, as will be explained in a subsequent portion of the specification. The pulse count in the 12-bit latch 33 is converted to an analog signal in the 12-bit digital-to-analog converter 34 and the analog signal is converted into a logarithmic analog signal in the log converter 35. The output of the log converter 35 is a logarithmic analog signal representing the logs of the count rate during a sampling period.

In order to provide for circuit simplicity, AND gate 37 is coupled to each stage of the four-bit up-down counter 30. With all of the stages of the up-down counter 30 in the zero state, a disabling signal is applied to AND gate 28, preventing any background or down signals from reaching the up-down counter 30. This prevents the up-down counter 30 from counting below zero.

In FIG. 3 there is shown the timing circuit used with this invention. A clock 40 provides the basic timing signals which are coupled through AND gate 41 to a counter 42. Counter 42 acts as a dividing counter so that the actual clock rate applied to the sampling period counter 44 is at a lower rate than the clock frequency. The decode circuit 45 acts to develop stop signals at various time intervals determined by the count in counter 44. The duration of the sampling period is determined by the position of selector switch 49 which selects the appropriate stop signal output as determined by decode circuit 45. Decode circuit 47 develops an enabling signal for AND gate 50 when all of the stages of counter 42 are at zero in order to mark accurately the end of the sampling period.

Flip-flop 51 is a conventional bistable circuit which is set to a first state by a signal from AND gate 50 and a second state by an output signal from monostable multivibrator 54. With flip-flop 51 in the second state, a count control signal is coupled to AND gates 27 and 28 of FIG. 2 and AND gate 41 of FIG. 3 to mark the beginning of the sampling period. With flip-flop circuit 51 in the first state, AND gates 27, 28 and 41 are disabled and a timing pulse is applied to the delay circuits 53, 56 and 59. The outputs of delay circuits 53, 56 and 59 sequentially energize the monostable multivibrators 54, 57 and 60 to provide short-duration control signals at the appropriate time.

In explaining the operation of the timing circuits of this invention, reference will be made to FIGS. 2 and 3. Assume that the counters 30, 31, 42 and 44 are reset to the zero state and that the flip-flop 51 is in the second state so that AND gates 27, 28 and 41 are enabled. With AND gates 27 and 28 enabled, the signal and background pulses are coupled to the up-down counter 30 and the eight-bit counter 31 where they are counted as previously explained. The clock pulses from clock 40 are coupled through AND gate 41 to the counters 42 and 44 to measure the sampling period time. When the count in counter 44 reaches the desired count and the count in counter 42 is zero, the end of the sampling period has been reached and a stop pulse is developed by AND gate 50 which causes flip-flop 51 to assume its first state. At this point, AND gates 27, 28 and 41 are disabled so that signals received are no longer counted. The counting circuit is also disabled so that the time interval is no longer measured.

At the same time that flip-flop 51 goes to its first state, an output pulse is applied to the delay circuits 53, 56 and 59. In this example, delay circuit 59 after a delay of 0.1 microsecond develops an output which actuates monostable multivibrator 60. Multivibrator 60 develops a latch transfer signal of short duration which is applied to the 12-bit latch 33. The latch transfer signal causes the 12-bit latch to assume the count which is contained in the four-bit up-down counter 30 and the eight-bit counter 31. A short time after the latch transfer signal is applied to 12-bit latch 33, a reset pulse is developed through the 0.5 microsecond delay circuit 56 and monostable multivibrator 57. The reset pulse is applied to counters 30, 31, 42 and 44 to reset these counters to zero. A short time after the reset pulse has been applied to the appropriate counters to reset them, a start pulse developed through the 1 microsecond delay circuit 53 and the monostable multivibrator 54 is applied to flip-flop 51, setting the flip-flop in the second state, at which point an enabling signal is applied to AND gates 27, 28 and 41 to start a new sampling period. This repeated sampling continues as long as the monitoring device is in operation.

Each time a radiation pulse is detected by detector 17, the detection circuit is "dead" for the duration of this received radiation. Thus, the actual period of time over which sampling can take place is less than the desired sampling period and can vary from period to period depending upon the count rate received. In order to compensate for this, a dead time detector 14 is used. In this example the dead time detector includes a comparator 63 which has one input coupled to the output of amplifier 20 for receiving the detected radiation signal. A second input to comparator 63 is a reference voltage level determined by the setting of potentiometer 64. The signal received from amplifier 20 is compared with the reference signal in comparator 63 and a dead time control signal is developed when the received signal from amplifier 20 is greater than the reference signal from potentiometer 64. The dead time control signal is applied to AND gate 41, disabling the gate, so that timing signals from clock 40 are prevented from reaching the timing counters 42 and 44. For the duration of the time during which the detection circuit is "dead", the timing circuit is not counting and the sampling period is increased by an amount equal to the dead time. Thus the actual sampling period during which radiation can be detected is the same for periods with high and low count rates.

The embodiments of the invention in which an exclusive property or privilege is claimed are defined as follows:

1. A device for counting desired radiation signals in the presence of strong background radiation signals, comprising, detection means having a radiation detector which develops input signals in response to radiation, said input signals including the desired radiation signals and the background signals, counting means coupled to said detection means for counting said desired radiation signals, timing means coupled to said counting means and generating a timing signal having a predetermined period, said timing signal acting to enable said counting means for said predetermined period whereby said counting means develops an output signal representative of the number of said desired signals counted during said predetermined period, signal detector means coupled to said detection means and said timing means, said signal detector means being responsive to said input signals to develop a control signal of a particular period for each of said input signals and apply said control signal to said timing means, each of said control signals acting to disable said timing means for said particular period whereby the duration of said predetermined period is increased for said particular period by each of said input signals.

2. The radiation counting device of claim 1 wherein, said signal detection means is a comparator having a fixed reference signal, said comparator acting to compare the amplitude of said input signals with said fixed reference signal to develop said control signal only during the time said amplitude of said input signals is greater than said fixed reference signal.

3. The radiation counting device of claim 2 wherein, said timing means includes means for selectively changing said predetermined period.

4. The radiation counting device of claim 3 wherein, said detection means includes signal analyzer means couple to said radiation detector, said signal analyzer means being responsive to said input signals to develop therefrom first radiation signals comprising said desired radiation signals and said background radiation signals and second radiation signals comprising said background signals, said counting means including a bidirectional counter having a first input coupled to said analyzer means for receiving said first radiation signals and a second input coupled to said analyzer for receiving said second radiation signals, signals received at said first input causing said bidirectional counter to count in a first direction, signals received at said second input causing said bidirectional counter to count in a second direction opposite to said first direction to subtract said second radiation signals from said first radiation signals to develop said desired signals.

5. The radiation counting device of claim 4 further including memory means coupled to said counting means, said memory means acting to store during a subsequent predetermined period the total count accumulated in said counting means during said predetermined period.

6. The radiation counting device of claim 5 further including digital to analog converting means coupled to said memory means, said digital to analog converting means acting to change said accumulated count stored in said memory means to an analog signal, and log converter means coupled to said digital to analog converter means for changing said analog signal to a log analog signal.

7. The radiation counting device of claim 6 wherein, said counting means includes a plurality of counting stages, first gate means coupled to each of said plurality of counting stages and responsive to a zero count in each of said counting stages to develop a disabling signal, second gate means coupled to said first gate means and coupling said analyzer means to said second input, said second gate means being responsive to said disabling signal to block said second radiation signals from said counting means whereby said counting means is prevented from counting to a number less than zero.

* * * * *